No. 807,822. PATENTED DEC. 19, 1905.
C. L. HOOPER.
TROLLEY HARP.
APPLICATION FILED APR. 16, 1904.
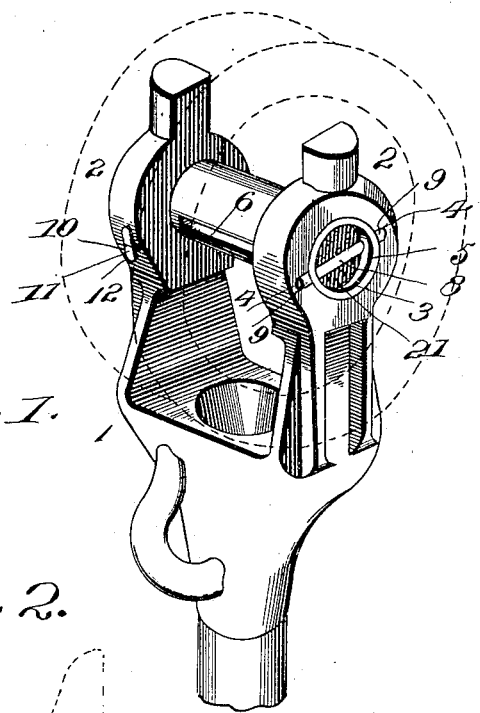
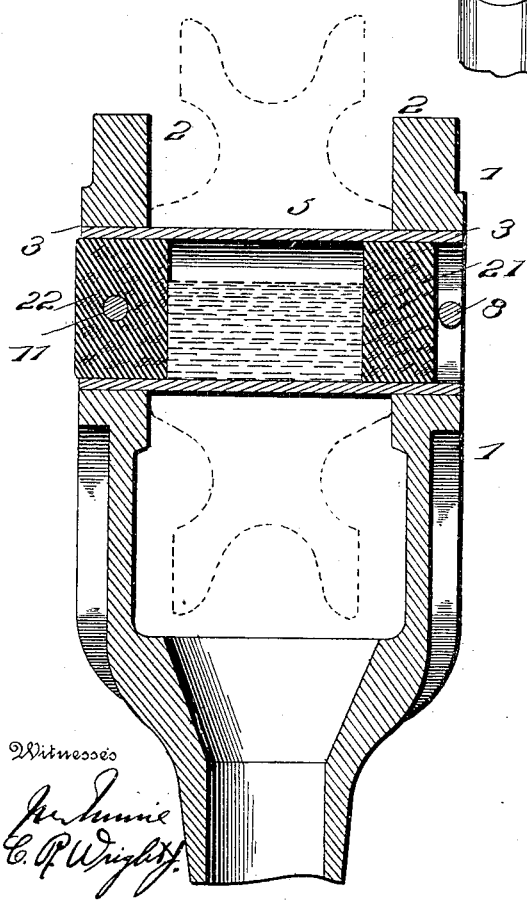
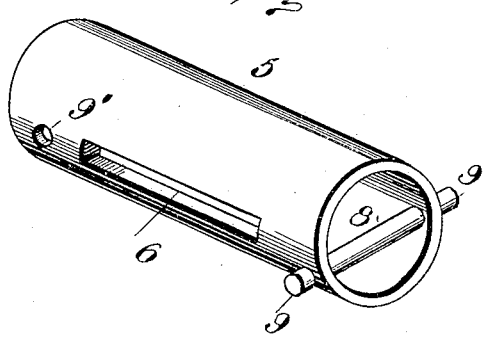

UNITED STATES PATENT OFFICE.

CHARLES L. HOOPER, OF ROCHESTER, NEW YORK.

TROLLEY-HARP.

No. 807,822. Specification of Letters Patent. Patented Dec. 19, 1905.

Original application filed December 15, 1903, Serial No. 185,264. Divided and this application filed April 16, 1904. Serial No. 203,493.

*To all whom it may concern:*

Be it known that I, CHARLES L. HOOPER, a citizen of the United States, residing at Rochester, in the county of Monroe and State of New York, have invented new and useful Improvements in Trolley-Harps, of which the following is a specification.

My invention relates to improvements in trolley-harps, the object of which is to produce a simple and effective trolley-wheel for electric railways.

This is a divisional application of my former application for improvements in trolley-harps, filed December 15, 1903, Serial No. 185,264, and pertains more particularly to means for automatically lubricating the wheel carried by the harp.

In the accompanying drawings, Figure 1 is a perspective view of the trolley-harp embodying my invention. Fig. 2 is a vertical sectional view of the same. Fig. 3 is a detached perspective view of the lubricating-shaft, showing the corks removed.

Referring now to the drawings, 1 indicates the forked portion of the device, having, as usual, the two parallel arm portions 2. These parallel arm portions are provided with transverse openings 3, the outer wall of one of these openings being provided with a lateral recess 4. Passing through these openings is a hollow shaft 5, which receives the trolley-wheel and upon which the same is adapted to revolve. This hollow shaft is provided with a longitudinal opening 6 of a length to extend practically from the inner side of one of the arms of the harp to the inner side of the arm at the opposite side, and thus it will be seen that the entire bearing-surface of the trolley-wheel is thoroughly lubricated. One end of this hollow shaft is provided with a transverse pin 8, which has its end 9 extending beyond the outer wall of the hollow shaft and adapted to rest in the recess of the trolley-harp arm. The opposite end of the hollow shaft is provided with transverse openings 9', registering with the openings 10, made in one of the arms 2, and through these openings a securing-pin 11 is passed. This securing-pin is preferably of the split form and has its ends turned laterally, as shown at 12.

For the purpose of making the device self-oiling the hollow shaft is filled with lubricant, such as oil or grease, and the ends of the shaft closed by means of corks 21 and 22. The cork 21 is first pressed in and against the transverse pin 8, the shaft filled with lubricant, and the cork 22 then pressed into the opposite end and held in place by the movable pin 11. In operation sufficient of the lubricant within the hollow shaft will pass through the longitudinal opening 6 to properly lubricate the wheel-bearing for a long time. When it is desired to add additional lubricant or to clean out the old lubricant, the split pin 11 is removed, which allows the cork 22 to be readily removed, and thus permit access to the interior of the hollow shaft. When it is desired to remove the hollow shaft, the pin 11 is withdrawn, the same as when the cork 22 is removed, and the shaft can be forced outwardly through the opposite arm.

Having thus described my invention, what I claim as new, and desire to secure by Letters Patent, is—

A trolley-harp comprising parallel arms having oppositely-arranged openings, a hollow shaft passing through said openings and having open ends, said shaft having an elongated longitudinal opening intermediate its ends, cork plugs compressibly forced within the ends of said shaft, a transverse pin passing through one arm of the harp and through the shaft and cork plug, the opposite arm of the harp having recesses in its outer face communicating with the opening, and a pin passing through said shaft on the outside of the plug and having its ends extended beyond the shaft and resting in the recess in the outer face of the arm.

In testimony whereof I have hereunto set my hand in the presence of two subscribing witnesses.

CHARLES L. HOOPER.

Witnesses:
A. W. MUDGE,
W. H. FRICK.